Feb. 16, 1937. E. E. LITTLEFIELD 2,070,607
VALVES AND THEIR OPERATION
Filed Sept. 28, 1931
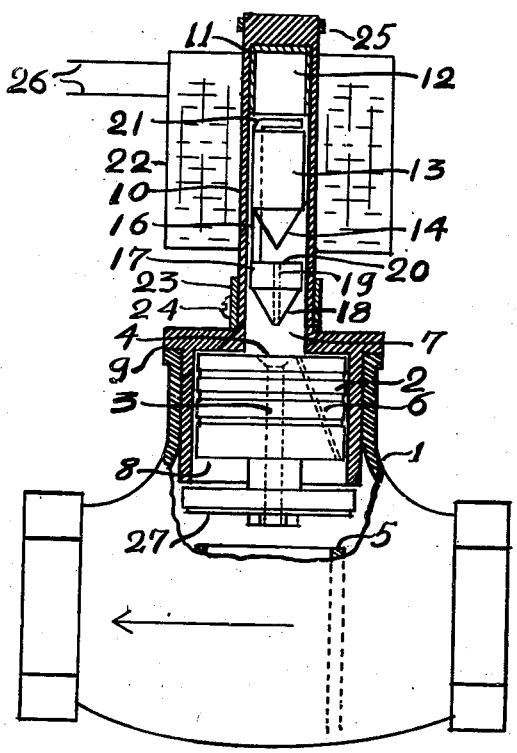
Fig. 1.
Fig. 2. Fig. 3.
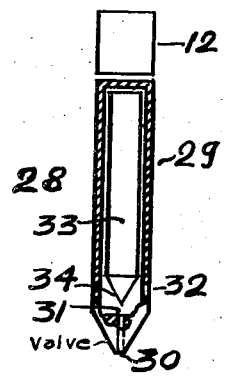
Fig. 4.
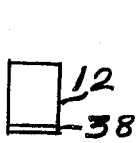
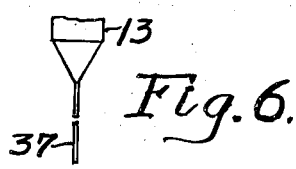
Fig. 6.
Fig. 5.
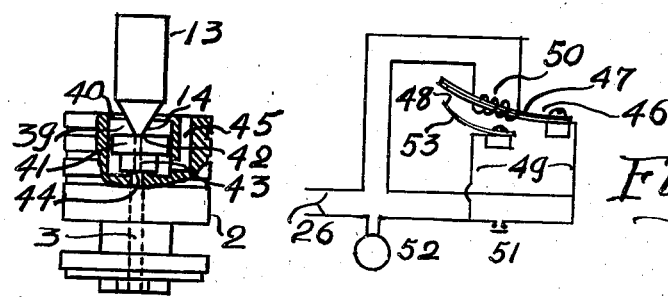
Fig. 8
Fig. 7.
INVENTOR.
Edgar Earl Littlefield Patented Feb. 16, 1937

2,070,607

UNITED STATES PATENT OFFICE 2,070,607

VALVES AND THEIR OPERATION

Edgar Earle Littlefield, Los Angeles, Calif.

Application September 28, 1931, Serial No. 565,589

16 Claims. (Cl. 137—139)

Briefly considered this invention relates to improvements in valves designed to function on either alternating or direct current without overheating.

Another object is to provide a valve the cost of which will permit of its adoption and use generally.

Another object is to provide a quick acting valve that will not stick and that will seat without an objectionable hammer blow.

Another object is to provide a device that when closed will not permit leakage of fluid.

Another object is to provide a simplified construction, so that wear on the parts is reduced to a minimum.

Besides being economical in power consumption, numerous other objects and advantages including, compactness of assembly, economy in manufacture and installation, reliability of operation, the advantage consisting of few moving parts and delicacy of operation will be readily appreciated as the invention becomes better understood upon reference to the following description and the accompanying drawing, in which Fig. 1 is a view, partly in cross-sectional elevation, of the invention embodied in a valve body of the well known globe type;

Figs. 2 and 3 are upper or top views of one of the moving parts. In the latter, one of the co-operating parts is shown while in the former this part has been omitted.

Fig. 4 is a view, partly in cross-sectional elevation, of a modified form of armature and pilot or auxiliary valve.

Fig. 5 is a side view of two of the armatures used in a modified form of the invention.

Fig. 6 is a side view of a section of one of the auxiliary valves which, in a modified form, has been provided with guiding means by which its capacity to properly seat is increased.

Fig. 7 is a side elevation, partly in cross section, of a modified form of piston with an auxiliary valve combination and a co-operating armature.

Fig. 8 shows co-operating electrical means which may, when necessary or desirable, be employed to delay the closing of the valve.

In the various views like numerals refer to similar parts.

Arrows indicate direction of fluid flow.

In Fig. 1 I have illustrated the invention in a form in which, up to a certain point, standard types of valves, such as certain piston types made by the Foster Engineering Company or the G. M. Davis Regulator Company, may be employed. Such parts, in modified form, may consist of casing 1 provided with the usual piston 2 having a central by-pass 3 with a valve seat 4 at its upper end, said piston having cushioned engagement with a seat 5. If desirable, the piston may be provided with a second by-pass 6 which serves as additional means for permitting fluid to enter the chamber 7 above the piston. It will be understood that the piston 2 is rather loosely fitted in the bore 8 of the bonnet 9, so that fluid enters chamber 7 around the piston. While the piston and bonnet 9 are of a modified standard type it is obvious that the latter has been provided with a tubular extension 10, preferably formed of brass or some other non-magnetizable metal, within which, at its upper end, is fixedly mounted, as at 11, by sweating, or in any other suitable manner, a magnetizable core member, preferably formed of stainless iron or its equivalent, said core member 12 co-operating with a reciprocating armature 13, preferably formed of stainless iron or some other equivalent magnetizable material. This armature 13, besides having a valve 14 at its lower end, is also provided with a longitudinal slot 15, Fig. 2, adapting the valve-armature device for sliding movement on a wirelike extension 16 of a valve device 17 having a valve 18 at its lower extremity, co-operating with the seat 4 of the piston 2, and a by-pass 19 with a seat 20 at its upper end. Obviously, the valve 14 co-operates with this latter seat. The parts 16 and 17 are preferably formed of non-magnetizable material, such as brass, while the former is bent, as at 21, to form a separator between the two magnetizable members 12 and 13.

Further consideration of the device illustrated in Fig. 1 will disclose a winding or coil 22, adjustably positioned as by means of the sleeve 23 which is, also, adjustably secured by means of set screw 24, and the threadedly mounted nut 25, on to the tubular extension 10, which may form an integral part of the bonnet 9. However, the extension 10 and bonnet 9 may be secured together in any other manner that will form a fluid tight joint. A circuit 26 connects the coil 22 with any suitable source of current. In this connection I have found that a small transformer supplying from 75 to 100 watts at from 18 to 24 volts sufficient for operation of the device. Current may be obtained from any other suitable source, however, such as that supplied by the ordinary service main. The coil 22 is so arranged on the extension 10 that its position may be freely adjusted. The adjustable arrangement of the coil provides means by which efficient operation is obtained, particularly in a type of valve having a fixedly mounted core such as that at 12. The coil may be removed by removal of the threaded nut 25 from the extension 10. Obviously, the extension 10 is closed at its upper end so that a fluid tight chamber is provided. This valve is an improvement on the type shown and described in Patent Number 1,633,217 which is referred to for purposes of information.

I have found that a valve disc 27 formed of pure gum rubber admirably adapted for controlling domestic water at ordinary temperatures, while a composition disc is preferable for controlling hot water or steam. For controlling air a gum rubber disc is preferable. In selecting a size of valve for the above description it has been found preferable to refer to a three-quarter inch type since more experimental work has been done on this type. Accordingly, it is not intended in any case to fix the diameter of the by-passes since this may vary under different conditions depending on the size of the valve, etc.

Assuming that the valve is properly connected to a source of current such as to the secondary circuit of a transformer supplying 100 watts at 24 volts, the winding on the valve being adjusted for the most efficient operation, and that the valve itself is connected to a source of fluid, such as air, steam or water, at a pressure of from 50 to 100 pounds, it will be obvious that the ability of the applied electrical power to lift the valve controlled by the fixed armature 12 will depend upon the fluid pressure applied on the valve when it is seated and the ability of the applied power to overcome such pressure. In other words, the less the seating area of the valve the less the power required to unseat it, provided, of course, that the pressure conditions in the valve chamber are the same. By providing two or more auxiliary valves instead of one it is possible to control a very small by-pass in a main auxiliary valve by means of a much smaller auxiliary valve, in which case it is possible to unseat the smaller auxiliary valve with much less energy than would be the case with a valve having a larger seating area. In other words, the seating area of the valve 14 being considerably less than that of the valve 18 it is apparent that the pressure on the latter will be greater than that on the former. Whether by mechanical or other means it is evident that it will be easier to unseat the smaller valve. The by-pass 3 is, of course, of considerably greater capacity than the by-pass 19. In practice I have found that a main by-pass, such as the by-pass 3, should preferably be about one-eighth inch in diameter, while half that, or less, as a diameter for the smaller by-pass, such as the by-pass 19, is a suitable and satisfactory proportion and arrangement.

Normally, with the casing in an upright position, due to the pressure of the fluid and their weight, the valves occupy their respective seats, so that the by-passes 3 and 19 are closed, under which conditions the main valve 2 is held to its seat by the co-operative action of gravity and the pressure of the fluid. The theory of operation of this type of piston is so well known that it is deemed unnecessary to detail the same here. Upon energizing the coil 22, assuming of course that the valves are in a seated position, the armature 13 will be attracted to the stationary magnetizable core piece 12 thus unseating the valve 14 from its seat 20. In its movement upward toward the stationary armature it contacts the bend 21 of the non-magnetizable wirelike extension 16 of the non-magnetizable companion piece 17 unseating the latter from its seat 4. Upon de-energizing the coil 22 the two auxiliary valves 14 and 18 drop to their seats, thus preventing an escape of fluid through by-pass 3, thereby causing a closing of the main valve 27 which at this time rests on its seat 5. Obviously, the theory of operation above described may be utilized in numerous other ways with like results. While not shown, it is assumed that a switch or other circuit controlling device is included in circuit 26.

In Fig. 4 is shown a device 28 which may, if desired, be substituted for the co-operating parts 13, 16 and 17, the plug 12 being shown for explanatory purposes only. This device includes a tubular non-magnetizable member, preferably made of brass, indicated at 29, which is closed at the top but which is provided with a by-pass 30 having a seat 31 at its upper extremity. An opening 32 in the wall provides an inlet for the admission of fluid to the by-pass. A stainless iron armature 33 having a tapered valve 34 at its lower end co-operates with the seat 31 to control the by-pass 30. The operation of this device when substituted for the members referred to will be understood from the above description.

If desired, a third magnetizable member or armature 35 may be inserted between the device 28 and the stationary armature 12. When the device 28 moves to its seat the armature 35, which is preferably formed of stainless iron, travels with it, thus reducing the distance between the armature 33 and the armature 12. A brass disc 36 is sweated on to the upper end of 35 to prevent magnetic sticking.

It is sometimes desirable to provide the auxiliary valve such as either of those shown at 14 or 34 with a guide. Such a guide 37 is shown in Fig. 6. This guide should be sufficiently thin to enter the smaller by-pass, such as the by-pass 19, and may be sufficiently long to enter the by-pass 3 of the piston 2 when all the valves are open, in which case it will form a guide for the two auxiliary valves.

In Fig. 7 is shown a modified form of the piston 2 and auxiliary valve combination in which the former is provided with a bore 39 having an annular shoulder or stop 40 and within which bore a fluid operated auxiliary valve 41 is arranged to function. When the modified form of piston of Fig. 7 is substituted for that of Fig. 1 the parts 16 and 17 may be omitted. As thus arranged the valve 14 co-operates with the seat 42 at the upper extremity of a by-pass 43 in the piston valve 41 which co-operates with a valve seat 44 at the upper end of the by-pass 3 to close the latter against release of fluid. To prevent magnetic sticking a brass disc 38 is sweated on to the lower end of the core 12. A duct 45 in the piston 2 permits fluid to enter the bore 39. The area of the piston portion of the piston valve 41 being greater than its seating area the pressure of the fluid will lift the piston from its seat when the by-pass 43 is opened. When this occurs the main valve 2 is unseated.

In case where it is desired to delay or retard the closing of the valve the means shown in Fig. 8 may be employed. In this case a thermostatic switch 46 so designed and arranged that upon heat being applied to the temperature responsive arm 47 contact is made with the point 48, closing branch 49 of circuit 26. To apply heat to the arm 47 a suitable number of turns of circuit 26 are wound thereon, as at 50, and the circuit closed by means of the regular switch included in the circuit or a push button such as that shown at 51 may be used. Should it be desired to utilize the push button type of switch the regular switch should, of course, be closed. Assuming that 52 is the previously described valve, or any other type of valve such as one that is connected to be operated by an electric motor included in the circuit, and that circuit 26 is closed, as by means of switch 51, it is apparent that the current carried by the circuit will heat the thermostatic arm 47 causing contact to be made with contact point 48 which action will depress the spring arm 53, which carries the contact point. A certain time will be required to cool the thermostatic arm and this time will retard the opening of the branch circuit 49, so that for some time after switch 51 is opened current will continue to flow to the valve 52 or any other device that may be substituted therefor which may be an electric motor.

Referring again to the arrangement shown in Fig. 4, it has been found that if the movable armature 35, Fig. 5, is interposed between the stationary armature 12 and the device 28 and the coil arranged to move freely on the tubular extension 10 this coil 22 will travel with the armature 35 which, in certain cases, adds to the efficiency of the device.

This application contains subject matter common to Patent 1,862,937, filed Sept. 2, 1925; Patent 1,885,846, filed Oct. 4, 1926, and Patent 1,893,627, filed Jan. 22, 1925, said patents having been issued by the United States of America.

I contemplate that, if necessary, two or more auxiliary valves may be employed and that a sufficient number of these may be provided with by-passes. Obviously, the controlling one would not be provided with the by-pass. In the present arrangement the by-pass 19 is preferably smaller than the by-pass 3, the theory being that, under less pressure, the valve 14 will be more easily unseated. If another auxiliary valve is provided, its by-pass, if it is provided with one, should preferably be smaller yet.

The weight and displacement of the parts that are electrically operated should be as little as possible. In this respect the part 13 preferably weighs less and displaces less fluid than the main valve 2, while the device 16—17 preferably weighs less and displaces less fluid than the device 13. However, within certain limits it will be found possible to vary the above figures.

While in the foregoing I have illustrated and described typical embodiments whereby my invention may be carried into practice it will be apparent that many modifications in the structure used, as well as in the elements themselves, and in the application thereof, may be made without departing from the scope of the appended claims.

I claim:

1. In an electrically controlled valve combination a fluid pressure chamber and a main valve responsive to the pressure condition of said chamber; a seat at times supporting the weight of said main valve; a second valve controlling the main valve, the main valve at times supporting the weight of the second valve, an armature; and a pilot valve the weight of which is at times supported by said main valve, both said pilot and second valves being in said chamber and operative successively by said armature to enable the fluid to open the main valve.

2. In an electrically controlled valve structure a pressure chamber housing an armature; a pilot valve controlled by the armature and controlling release of pressure from said chamber; a main valve responsive to release of pressure from said chamber; and an intermediate valve also operative by said armature to increase the rate at which pressure is released from the chamber over that released by the pilot valve, the pilot valve at times being supported by said main valve.

3. In an electrically controlled valve structure a pressure chamber housing an armature; a main valve responsive to the pressure condition of said chamber, said valve having a by-pass; a seat arranged to support the weight of said valve; a second valve having a by-pass co-operating with that of the main valve, said seat at times supporting the weight of the second valve; and a pilot valve controlling the by-pass of the second valve, the armature operating both the pilot and second valve in succession.

4. In an electrically controlled valve a pressure chamber housing an armature and a pilot valve controlled by said armature; a second valve responsive to the pressure condition of said chamber at times supporting the weight of the pilot valve and means in the path of and actuated by said pilot valve for mechanically unseating the second valve and a main valve controlled by said pilot and second valve.

5. In an electrically controlled valve structure having a main pressure chamber open to line pressure and a valve responsive to the pressure condition of said chamber, an armature, a pilot valve operative by said armature to release pressure from said chamber and housed therein a second valve on which the pilot valve seats and operative by said armature after operation of the pilot valve, an electric circuit and additional thermostatic controlling means therefor so arranged that the thermostatic means acts to retard the closing of the valve.

6. In an electrically controlled valve having a pressure chamber with a seat therein arranged to support a main fluid operated valve, a main fluid operated valve the weight of which at times is supported by said seat; a second fluid operated valve carried by the main valve when it is seated and controlling the latter and a third valve concentrically arranged with respect to the main valve and controlling the second valve; an armature operative to raise the third valve and means between said second and third valves whereby said armature also operates said second valve.

7. An electrically controlled valve combination including a fluid operated valve having a by-pass; a plurality of auxiliary valves at times supported by said fluid operated valve, an armature adapted to operate said auxiliary valves in succession and a discharge outlet common to the fluid controlled by said valves.

8. In an electrically controlled valve having a pressure chamber with a seat therein arranged to support a main fluid operated valve, a main fluid operated valve the weight of which at times is supported by said seat, said valve having a by-pass, a second valve controlling said by-pass, said second valve also having a by-pass and at times being supported by said seat, and a third electrically controlled valve controlling the by-pass of the second valve, said electrically controlled valves having connecting means independent of the walls of said chamber whereby one armature may operate said second and third valves in succession.

9. In an electrically controlled valve having a pressure chamber with an inlet and an outlet opening and a partition therebetween having a port therein, a valve seat provided by said port and a main fluid operated valve the weight of which at times is supported by said seat, said valve having a by-pass, a second valve controlling said by-pass, said second valve also having a by-pass, a third valve controlling the by-pass of the second valve, said second and third valves at times being supported by said seat, said port forming an outlet common to the fluid controlled by all of said valves and a single armature to operate both said second and third valves in succession.

10. In an electrically controlled valve a pressure chamber with a seat therein arranged to support a fluid operated valve, a fluid operated valve the weight of which at times is supported by said seat, a second valve at times supported by said fluid operated valve and a third valve at times supported by said seat, each of said valves, in opening, moving in a common direction and a common armature for operating the second and third valves in succession.

11. In an electrically controlled valve having inlet and outlet openings and a pressure chamber therebetween with a port providing a seat for a fluid operated valve, said chamber being imperforate except for said openings, a fluid operated valve the weight of which at times is supported by said seat, said valve having a by-pass, a second valve at times supported by said fluid operated valve, and a third valve at times supported by said seat, and an armature carried by the third valve and operative to open the second valve.

12. In an electrically controlled valve a pressure chamber housing an armature and pilot valve; an auxiliary valve at times supporting the weight of the armature and pilot valve; and a third fluid operated valve at times supporting the weight of both of the above valves, the pilot valve being operative independently of the fluid to operate the auxiliary valve and having means for guiding it to its seat independent of the walls of said chamber.

13. A valve structure comprising a casing, a main valve therein, the casing having an extension, a plurality of pilot valves in the extension seating one upon the other and the lowermost of the pilot valves seating on the main valve, a coil surrounding said extension and operative to separate the uppermost pilot valve from its seat on another pilot valve and by further movement cause the latter to rise from its seat.

14. In an electrically controlled valve combination, a pressure chamber housing, an armature carrying a pilot valve, a second valve element and a main valve in said housing, said main valve being arranged to support the weight of said second valve element and pilot valve, a by-pass controlled by the pilot valve, adapted to release pressure from the chamber at a given rate, and a by-pass in said second valve element also controlled by said armature and operative thereby after the operation of the pilot valve in automatically increasing the rate at which pressure is released from said chamber to cause an unseating of said main valve by the fluid in the system.

15. In an electrically controlled valve combination, a fluid pressure chamber and a main valve responsive to the pressure condition of said chamber; a seat at times supporting the weight of said valve; a second valve adapted to release pressure from above said main valve to cause it to unseat; a third valve to the operation of which said second valve is responsive; and electrical means including an armature controlling the third valve, said second and third valves at times being supported by said seat.

16. In the operation of an electrically controlled valve having a pressure chamber housing a main valve responsive to the pressure condition of said chamber, a main valve seat and two or more co-operating valves one at least of which is controlled by an armature housed in said chamber the weight of each of said co-operating valves at times being supported by said main valve seat, the method which comprises utilizing the armature to control one of the co-operating valves to release pressure from said chamber at a given rate and subsequently increasing the rate at which the pressure is released by means of another of said co-operating valves until the pressure on the main valve is insufficient to hold it to its seat.

EDGAR EARLE LITTLEFIELD.